(12) United States Patent
Liu et al.

(10) Patent No.: US 10,810,272 B2
(45) Date of Patent: Oct. 20, 2020

(54) METHOD AND APPARATUS FOR BROADCASTING SEARCH RESULT BASED ON ARTIFICIAL INTELLIGENCE

(71) Applicant: BEIJING BAIDU NETCOM SCIENCE AND TECHNOLOGY CO., LTD., Beijing (CN)

(72) Inventors: Kai Liu, Beijing (CN); Yang Feng, Beijing (CN); Qin Yang, Beijing (CN); Yajuan Lyu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 513 days.

(21) Appl. No.: 15/349,919

(22) Filed: Nov. 11, 2016

(65) Prior Publication Data

US 2017/0255702 A1 Sep. 7, 2017

(30) Foreign Application Priority Data

Mar. 1, 2016 (CN) .......................... 2016 1 0116708

(51) Int. Cl.
*G06F 16/9535* (2019.01)
*G06F 16/35* (2019.01)
(Continued)

(52) U.S. Cl.
CPC ...... *G06F 16/9535* (2019.01); *G06F 16/2468* (2019.01); *G06F 16/35* (2019.01);
(Continued)

(58) Field of Classification Search
CPC ......... G06F 17/30684; G06F 17/30569; G06F 17/3043; G06F 17/30401; G06F 16/3329;
(Continued)

(56) References Cited

U.S. PATENT DOCUMENTS 7,792,829 B2 * 9/2010 Brill ...................... G06F 16/248
707/728
8,296,284 B2 * 10/2012 Bierner ................... G06F 16/38
707/708
(Continued)

FOREIGN PATENT DOCUMENTS

CN  102184230 A  9/2011
CN  104361507 A  2/2015
(Continued)

OTHER PUBLICATIONS

China Patent Application No. 201610116708.2; Office Action; dated Aug. 3, 2018; 18 pages.
(Continued)

*Primary Examiner* — Marc S Somers
(74) *Attorney, Agent, or Firm* — BakerHostetler

(57) ABSTRACT

The present disclosure provides a method and an apparatus for broadcasting a search result based on artificial intelligence. The method includes: receiving a query sentence inputted by a user, and acquiring a plurality of candidate search results according to the query sentence; analyzing each candidate search result to determine a category of each candidate search result, in which the category includes a structured result and a rich-text result; acquiring intention information of the query sentence, and screening the plurality of candidate search results according to the intention information and the category of each candidate search result to obtain a screened search result; and generating text information corresponding to the screened search result, and broadcasting the text information.

16 Claims, 5 Drawing Sheets

(51) Int. Cl.
*G06N 5/04* (2006.01)
*G06F 16/638* (2019.01)
*G06F 16/2458* (2019.01)

(52) U.S. Cl.
CPC .............. *G06F 16/638* (2019.01); *G06N 5/04* (2013.01); *G06N 5/048* (2013.01)

(58) Field of Classification Search
CPC .... G06F 16/3344; G06F 16/258; G06F 40/56; G06F 16/638; G06F 16/9535; G06F 16/2468
See application file for complete search history.

(56) References Cited

U.S. PATENT DOCUMENTS

| | | | | |
|---|---|---|---|---|
| 8,566,102 | B1* | 10/2013 | Bangalore | G10L 15/22 704/270.1 |
| 8,682,647 | B1* | 3/2014 | Lee | G06F 16/3329 704/9 |
| 10,109,270 | B2* | 10/2018 | Sharifi | G06F 17/2775 |
| 2007/0067305 | A1* | 3/2007 | Ives | G06Q 30/02 |
| 2008/0270142 | A1* | 10/2008 | Srinivasan | G06F 16/957 704/270.1 |
| 2010/0082640 | A1* | 4/2010 | Wexler | G06F 16/9535 707/748 |
| 2013/0124964 | A1* | 5/2013 | Viegas | G06F 17/278 715/230 |
| 2014/0214428 | A1* | 7/2014 | Katae | G06F 16/685 704/275 |

FOREIGN PATENT DOCUMENTS

| | | |
|---|---|---|
| CN | 105068661 A | 11/2015 |
| CN | 105159996 A | 12/2015 |
| JP | 2003-308327 A | 10/2003 |
| JP | 2004-178167 A | 6/2004 |
| JP | 2004-185337 A | 7/2004 |
| JP | 2006-293830 A | 10/2006 |
| JP | 2009-151541 A | 7/2009 |

OTHER PUBLICATIONS

Japan Patent Application No. 2017-026070; Reasons for Refusal; dated Feb. 13, 2018; 12 pages.

* cited by examiner

METHOD AND APPARATUS FOR BROADCASTING SEARCH RESULT BASED ON ARTIFICIAL INTELLIGENCE

CROSS-REFERENCE TO RELATED APPLICATIONS

This application is based upon and claims a priority to Chinese Patent Application Serial No. 201610116708.2, filed on Mar. 1, 2016, the entire content of which is incorporated herein by reference.

FIELD

The present disclosure relates to the field of artificial intelligence technology, and more particularly to a method and an apparatus for broadcasting a search result based on artificial intelligence.

BACKGROUND

Artificial intelligence (AI for short) is a new technical science studying and developing theories, methods, techniques and application systems for simulating, extending and expanding human intelligence. The artificial intelligence is a branch of computer science, which attempts to know the essence of intelligence and to produce a new intelligent machine capable of acting in a same way as human intelligence. The researches in this field include robots, speech recognition, image recognition, natural language processing and expert systems, etc.

With the increasing improvement of science and technology, a search engine has become an indispensable part of people's lives and become more and more intelligent increasingly. At present, an interaction mode of the conventional search engine is that, a user inputs a search term, and then the search engine returns search results related to user's requirements and sequences them in an order of the correlation from high to low, and then the user may browse and click on the search results and select interested or required information and content from the search results.

However, the conventional interaction mode has following problems: the search engine cannot understand user's intention, so that the search results provided cannot concern for core information and the user needs to select content meeting the requirements from the search results by himself, thereby consuming time and causing high operating costs.

SUMMARY

The present disclosure aims to solve at least one of the technical problems in the related art to at least some extent. Accordingly, a first objective of the present disclosure is to provide a method for broadcasting a search result based on artificial intelligence, which may intuitively feedback core information required by a user, reduce user's operating costs, save user's time, and become more intelligent.

A second objective of the present disclosure is to provide an apparatus for broadcasting a search result based on artificial intelligence.

In order to realize the above objectives, embodiments of a first aspect of the present disclosure provide a method for broadcasting a search result based on artificial intelligence, the method including: receiving a query sentence inputted by a user, and acquiring a plurality of candidate search results according to the query sentence; analyzing each candidate search result to determine a category of each candidate search result, in which the category includes a structured result and a rich-text result; acquiring intention information of the query sentence, and screening the plurality of candidate search results according to the intention information and the category of each candidate search result to obtain a screened search result; and generating text information corresponding to the screened search result, and broadcasting the text information.

Embodiments of a second aspect of the present disclosure provide an apparatus for broadcasting a search result based on artificial intelligence, the apparatus including: a querying module, configured to receive a query sentence inputted by a user, and to acquire a plurality of candidate search results according to the query sentence; a determining module, configured to analyze each candidate search result to determine a category of each candidate search result, in which the category includes a structured result and a rich-text result; a screening module, configured to acquire intention information of the query sentence, and to screen the plurality of candidate search results according to the intention information and the category of each candidate search result to obtain a screened search result; and a broadcasting module, configured to generate text information corresponding to the screened search result, and to broadcast the text information.

DETAILED DESCRIPTION

Figure 1:
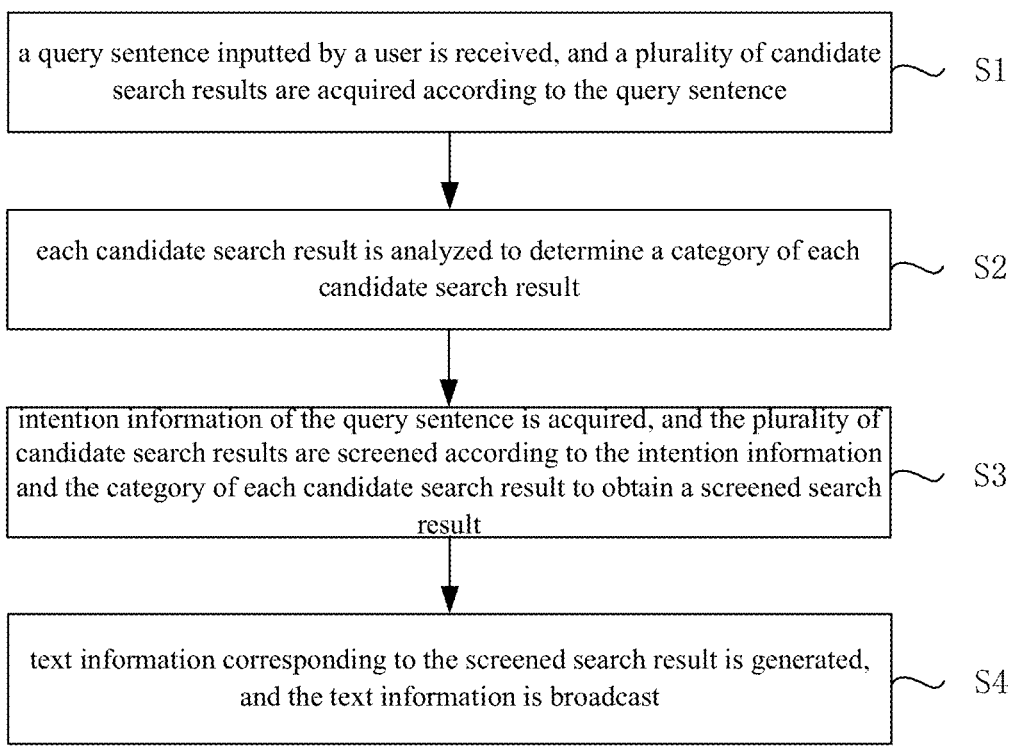
FIG. 1 is a flow chart showing a method for broadcasting a search result based on artificial intelligence according to an embodiment of the present disclosure.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

The method and the apparatus for broadcasting a search result based on artificial intelligence according to embodiments of the present disclosure will be described as follows with reference to drawings.

FIG. 1 is a flow chart showing a method for broadcasting a search result based on artificial intelligence according to an embodiment of the present disclosure.

As shown in FIG. 1, the method for broadcasting a search result based on artificial intelligence may include followings.

In S1, a query sentence inputted by a user is received, and a plurality of candidate search results are acquired according to the query sentence.

For example, the user inputs "IPHONE" into a search engine. The search engine may search for information related to "IPHONE", and show the plurality of candidate search results, such as "IPHONE's official website", "IPHONE's latest relevant information", "IPHONE's quotes" and the like, in a search result page.

In S2, each candidate search result is analyzed to determine a category of each candidate search result.

Figure 2:
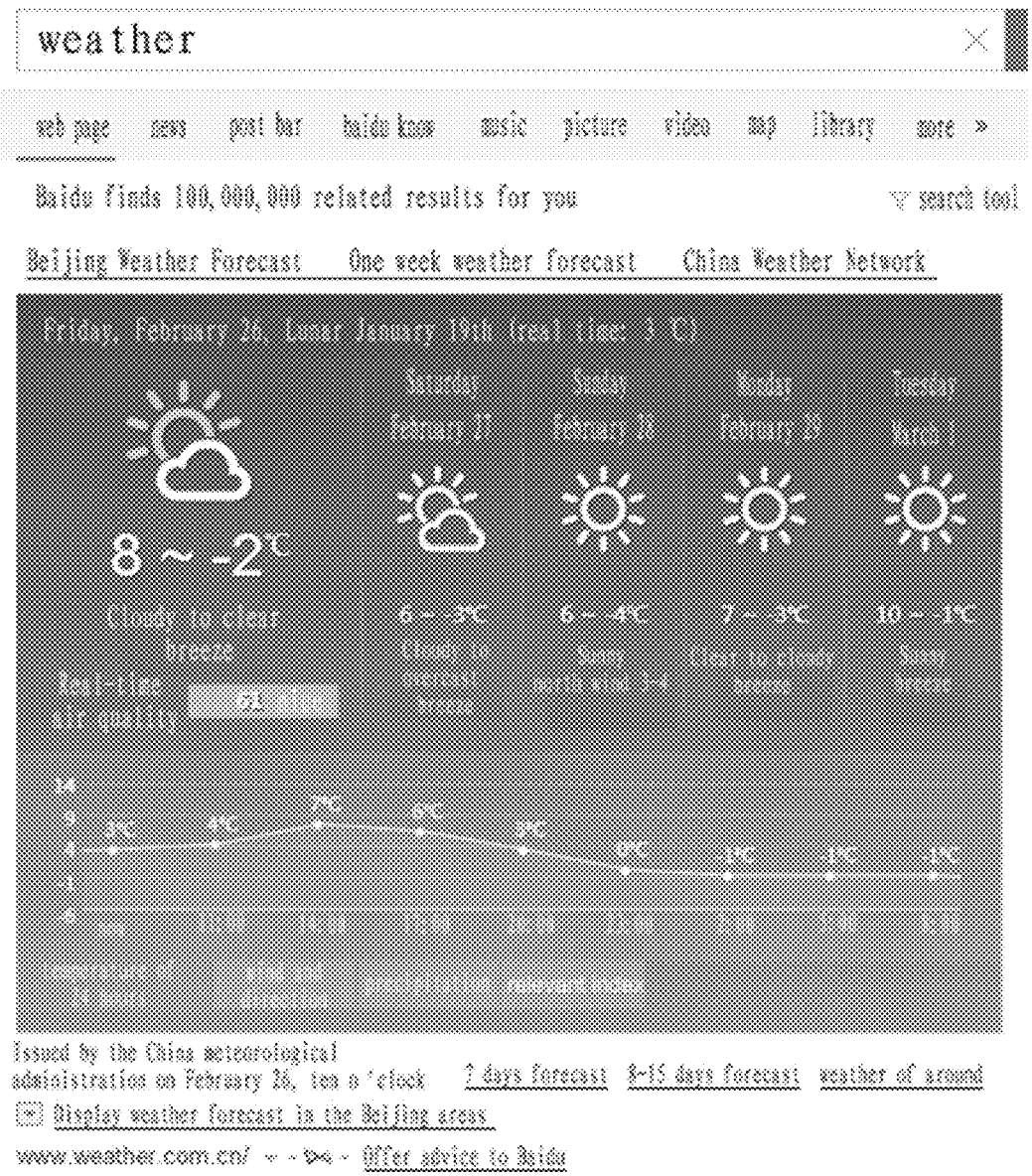
FIG. 2 is a schematic diagram illustrating a structured result.

Specifically, page content information corresponding to each candidate search result may be acquired. The page content information may be parsed and then a data characteristic corresponding to the page content information may be extracted. Then the category of each candidate search result may be determined according to the data characteristic. The category of the candidate search result may include a structured result and a rich-text result. For example, the structured result may include an ALADDIN result (which is provided by BAIDU ALADDIN platform that is a universal open platform launched by Baidu Search Engine Company), and the ALADDIN result is a search result directly showing an entity result via an interface. As shown in FIG. 2, today weather and the coming week's weather are shown directly via a preset interface. For another example, if the user queries one location, location information is shown directly via a map. The rich-text result may include text information results, such as news, forums, libraries or the like.

For example, the page content corresponding to one candidate search result may be represented by HTML (Hyper Text Markup Language). This HTML may be parsed to obtain the data characteristics of the page content, such as a title, a user name, content, and a location in the page, etc. It is assumed that the data characteristics include a topic name, a user name of a post sender and published content, a user name of a post replier and corresponding reply content, the number of reply posts, and a floor corresponding to the reply content, etc. It may be determined that the category of this candidate search result is a forum category (i.e. the rich-text result) based on the above data characteristics.

In S3, intention information of the query sentence is acquired, and the plurality of candidate search results are screened according to the intention information and the category of each candidate search result to obtain a screened search result.

In an embodiment of the present disclosure, the query sentence may be split into a plurality of words or phrases, and then the features (such as literal features, semantic features, and an important degree for the query sentence) of each word or each phrase may be analyzed, and then the intention information of the query sentence may be analyzed according to the above features, and then the search result meeting the broadcasting condition may be selected by combining the category of each candidate search result in the above step and the intention information of the query sentence. For example, if the intention information of one query sentence is identified as an intention of broadcasting without speech, there is no need to broadcast the corresponding search result, i.e. the search result corresponding to the query sentence may be filtered out. For another example, if the intention information of one query sentence is identified as an intention of broadcasting with speech, the search result that is not the structured result and the rich-text result in the corresponding search results may be filtered out.

In S4, text information corresponding to the screened search result is generated, and the text information is broadcast.

In an embodiment of the present disclosure, the method of generating the text information for the structured result is different from that for the rich-text result.

Figure 3:
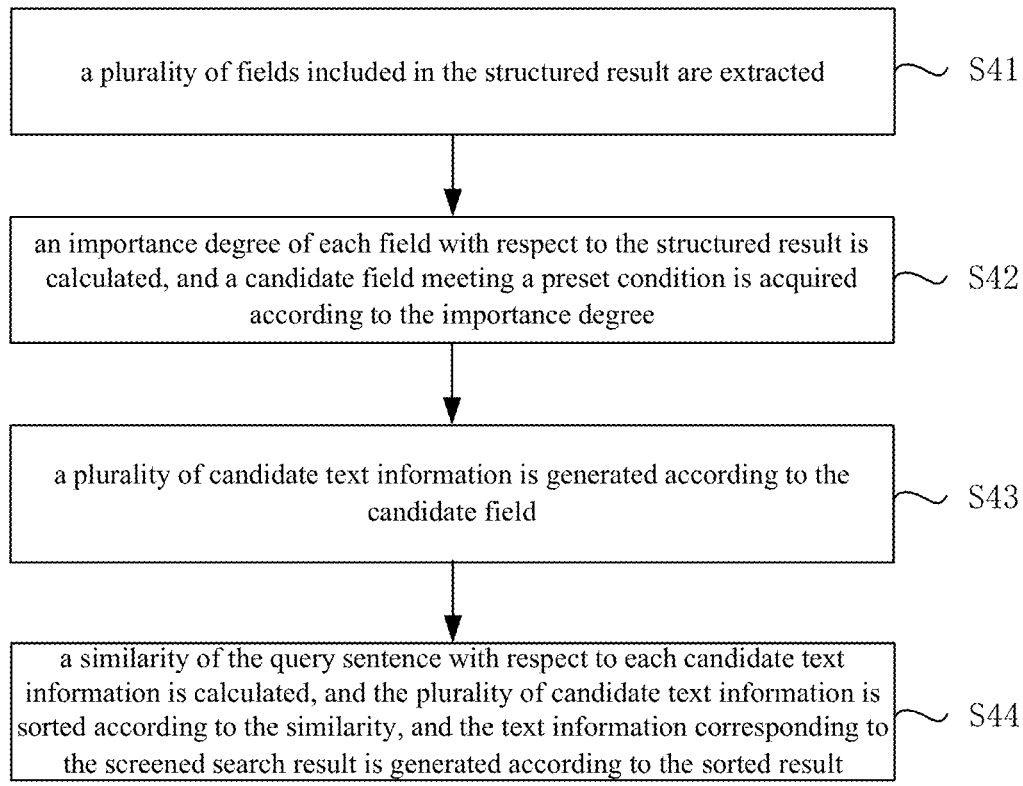
FIG. 3 is a first flow chart showing a process of generating corresponding text information according to an embodiment of the present disclosure.

Specifically, if the category of each candidate search result is the structured result, as shown in FIG. 3, generating the corresponding text information may include followings.

In S41, a plurality of fields included in the structured result are extracted.

In S42, an importance degree of each field with respect to the structured result is calculated, and a candidate field meeting a preset condition is acquired according to the importance degree.

In S43, a plurality of candidate text information is generated according to the candidate field.

In S44, a similarity of the query sentence with respect to each candidate text information is calculated, and the plurality of candidate text information is sorted according to the similarity, and the text information corresponding to the screened search result is generated according to the sorted result.

Specifically, the plurality of candidate text information is sorted based on a preset ranking model. The preset ranking model includes a Linear-Regression ranking model, and a Pair-Wise ranking model, etc.

For example, it is assumed that, the query sentence is "How is tomorrow's weather in Beijing." The screened structured result corresponding thereto may include fields, such as "Beijing", "tomorrow", "weather", and "how", etc. The importance degrees of the above fields with respect to the structured result may be calculated. The fields with the importance degree exceeding a preset threshold or with the importance degree in the top-three may be selected as the candidate fields. The above candidate fields may be spliced and combined to generate the plurality of candidate text information, for example, "Tomorrow temperature in Beijing is from XX to XX Celsius degrees, and the weather is sunny", "Tomorrow weather in Beijing is sunny, the temperature is from XX to XX Celsius degrees" and so on. The text suitable to be broadcasted continuously may be generated according to these disperse fields. After the plurality of candidate text information is generated, the similarity of the query sentence with respect to each candidate text information is calculated based on a language model, a syntax model, a semantic model, etc. The candidate text information with the highest similarity with respect to the query sentence is selected finally. The similarity may include at least one of a literal similarity, a semantic similarity and a broadcast style similarity.

In addition, in order to make the broadcasting be more in line with oral habits, a colloquial broadcast rewriting is performed on the plurality of candidate text information after the plurality of candidate text information is generated. For example: number 100000, if it is determined as a postal code, it may be rewritten as "one, zero, zero, zero, zero, zero", so as to avoid being broadcast as "one hundred thousand". For another example, a polyphone is rewritten, such as "Shan" in "Shan Tian-Fang" (who is Chinese) is broadcast Shan, reading of the fourth tone.

Figure 4:
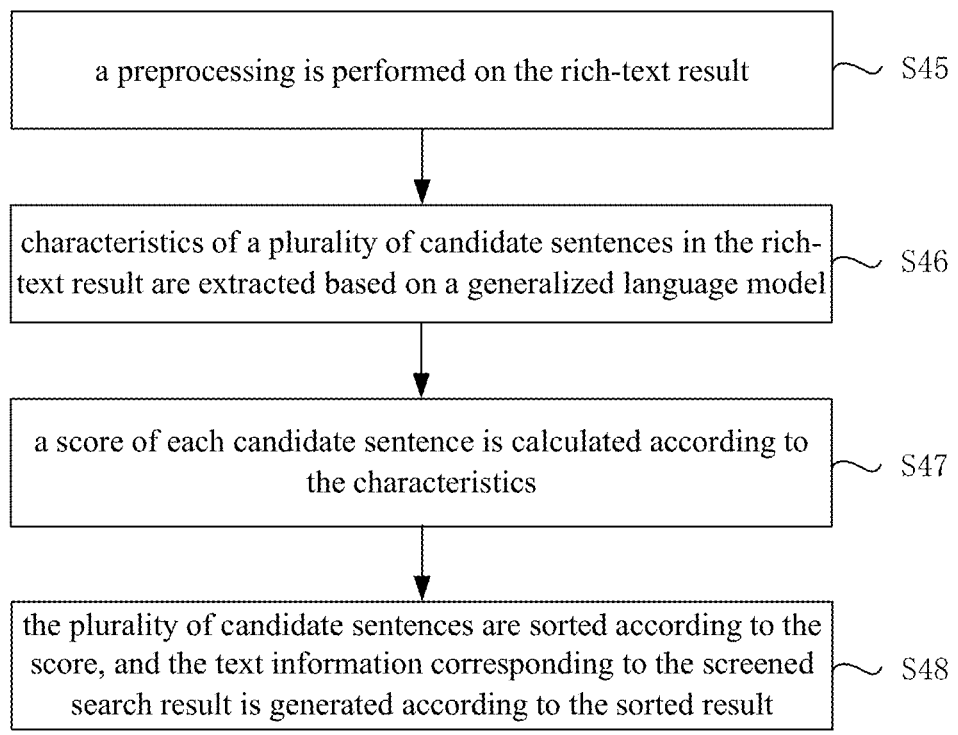
FIG. 4 is a second flow chart showing a process of generating corresponding text information according to an embodiment of the present disclosure.

If the category of each candidate search result is the rich-text result, as shown in FIG. 4, generating the corresponding text information may include followings.

In S45, a preprocessing is performed on the rich-text result.

The preprocessing may include at least one of text extraction, text de-duplication, keyword analysis, text structural analysis.

In S46, characteristics of a plurality of candidate sentences in the rich-text result are extracted based on a generalized language model.

The characteristics may include at least one of a semantic similarity and/or an intention similarity of each candidate sentence with respect to the query sentence, position information of each candidate sentence in the rich-text result, keyword information included in each candidate sentence, etc.

In S47, a score of each candidate sentence is calculated according to the characteristics.

In S48, the plurality of candidate sentences are sorted according to the score, and the text information corresponding to the screened search result is generated according to the sorted result.

For example, if the screened rich-text result is a news page of "lottery of passenger cars in Beijing", a main body of each page may be extracted. The structural analysis may be performed on the main body, for example, the main body is divided into three paragraphs, and contains a total of ten statements. The sentences related to the intention of "lottery of passenger cars in Beijing" may be extracted from the main body, and then characteristics of each sentence may be selected based on a language model, a syntax model, a semantic model, etc. The characteristics may include the semantic similarity related to "lottery of passenger cars in Beijing", location of the sentence in the main body, and whether or not the sentence includes key words, such as "Beijing," "passenger cars," "lottery," etc. The score of each sentence is calculated according to the above characteristics, and then sentences are sorted in an order of the score from high to low. For example, the sentence with the high similarity has a high score, the sentence with more keywords has a high score, etc. Finally the sentence with the highest score may be used as the abstract of the main body, i.e. the text information to be broadcasted, thereby realizing an aim that the lengthy text is reduced to concise abstract information with a clear intention and avoiding a too long broadcast time. Certainly, in order to make the broadcasting be more in line with oral habits, a colloquial broadcast rewriting may be performed on the candidate text information.

After, the text information is generated, the text information is synthesized into speech information based on a TTS speech synthesis technology, and the speech information is broadcasted. For example, if the user queries tomorrow weather in Beijing, the finally broadcasted speech information may be a message "tomorrow weather in Beijing is sunny, temperature is from 5 to 15 Celsius degrees, with the north wind from level 2 to level 3." Instead of just showing the next week' weather in Beijing to the user through the search result page, the search result required by the user is broadcasted directly, which is more in line with user' needs. And the speech broadcast may also increase enjoyment, attract the user's attention and deepen the impression of the user on the search result. Certainly, recommendation information may be broadcasted, for example, information "Please keep warm in cold weather" and other information may also be broadcasted according to the weather conditions after the weather conditions are broadcasted. The search results may be shown in the search result page at the same time when the speech information is broadcasted, thereby ensuring that the user may obtain consistent information visually and acoustically, so as to further enhance the user' experience.

The method for broadcasting a search result based on artificial intelligence according to embodiments of the present disclosure, by analyzing the query sentence inputted by the user to acquire the corresponding intention information, and selecting the search result meeting the broadcasting condition, and finally broadcasting the search result meeting user's intention via the generated continuous natural speech, may intuitively feedback core information required by the user, reduce user's operating costs, save user's time, and become more intelligent.

In order to realize the above objectives, the present disclosure also provides an apparatus for broadcasting a search result based on artificial intelligence.

Figure 5:
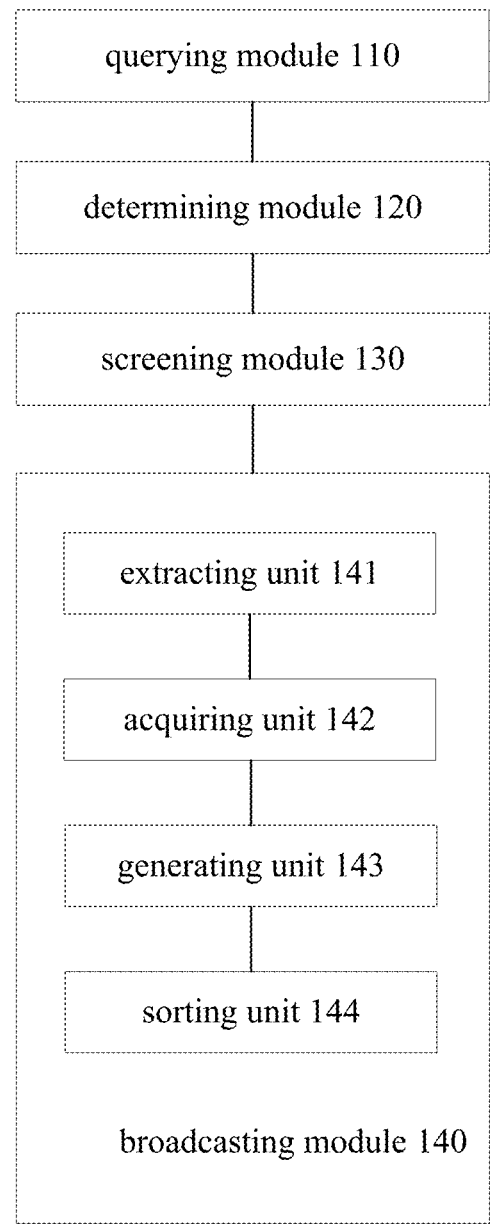
FIG. 5 is a first block diagram illustrating an apparatus for broadcasting a search result based on artificial intelligence according to an embodiment of the present disclosure.

FIG. 5 is a first block diagram illustrating an apparatus for broadcasting a search result based on artificial intelligence according to an embodiment of the present disclosure.

As shown in FIG. 5, the apparatus for broadcasting a search result based on artificial intelligence includes a querying module 110, a determining module 120, a screening module 130 and a broadcasting module 140.

The querying module 110 is configured to receive a query sentence inputted by a user, and to acquire a plurality of candidate search results according to the query sentence. For example, the user inputs "IPHONE" into a search engine. The search engine may search for information related to "IPHONE", and show the plurality of candidate search results, such as "IPHONE's official website", "IPHONE's latest relevant information", "IPHONE's quotes" and the like, in a search result page.

The determining module 120 is configured to analyze each candidate search result to determine a category of each candidate search result. Specifically, the determining module 120 may be configured to acquire page content information corresponding to each candidate search result, and to parse the page content information, and to extract a data characteristic corresponding to the page content information, and to determine the category of each candidate search result according to the data characteristic. The category of the candidate search result may include a structured result and a rich-text result. For example, the structured result may include an ALADDIN result (which is provided by BAIDU ALADDIN platform that is a universal open platform launched by Baidu Search Engine Company), and the ALADDIN result is a search result directly showing an entity result via an interface. As shown in FIG. 2, today weather and the coming week's weather are shown directly via a preset interface. For another example, if the user queries one location, location information is shown directly via a map. The rich-text result may include text information results, such as news, forums, libraries or the like.

For example, the page content corresponding to one candidate search result may be represented by HTML (Hyper Text Markup Language). This HTML may be parsed to obtain the data characteristics of the page content, such as a title, a user name, content, and a location in the page, etc. It is assumed that the data characteristics include a topic name, a user name of a post sender and published content, a user name of a post replier and corresponding reply content, the number of reply posts, and a floor corresponding to the reply content, etc. It may be determined that the category of this candidate search result is a forum category (i.e. the rich-text result) based on the above data characteristics.

The screening module 130 is configured to acquire intention information of the query sentence, and to screen the plurality of candidate search results according to the intention information and the category of each candidate search result to obtain a screened search result. In an embodiment of the present disclosure, the screening module 130 may be configured to split the query sentence into a plurality of words or phrases, and then to analyze the features (such as literal features, semantic features, and an important degree for the query sentence) of each word or each phrase, and to analyze the intention information of the query sentence according to the above features, and to select the search result meeting the broadcasting condition by combining the category of each candidate search result in the above step and the intention information of the query sentence. For example, if the intention information of one query sentence is identified as an intention of broadcasting without speech, there is no need to broadcast the corresponding search result, i.e. the search result corresponding to the query sentence may be filtered out. For another example, if the intention information of one query sentence is identified as an intention of broadcasting with speech, the search result that is not the structured result and the rich-text result in the corresponding search results may be filtered out.

The broadcasting module 140 is configured to generate text information corresponding to the screened search result, and to broadcast the text information. The category of each candidate search result may include a structured result and a rich-text result, and the method of generating the text information for the structured result is different from that for the rich-text result.

Specifically, the broadcasting module 140 may include an extracting unit 141, an acquiring unit 142, a generating unit 143 and a sorting unit 144.

If the category of each candidate search result is the structured result, the extracting unit 141 may be configured to extract a plurality of fields included in the structured result firstly. The acquiring unit 142 is configured to calculate an importance degree of each field with respect to the structured result, and to acquire a candidate field meeting a preset condition according to the importance degree. The generating unit 143 is configured to generate a plurality of candidate text information according to the candidate field. Finally, the sorting unit 144 is configured to calculate a similarity of the query sentence with respect to each candidate text information, and to sort the plurality of candidate text information according to the similarity, and to generate the text information corresponding to the screened search result according to the sorted result. Specifically, the plurality of candidate text information is sorted based on a preset ranking model. The preset ranking model includes a Linear-Regression ranking model, and a Pair-Wise ranking model, etc.

For example, it is assumed that, the query sentence is "How is tomorrow's weather in Beijing." The corresponding structured result may include fields, such as "Beijing", "tomorrow", "weather", and "how", etc. The importance degrees of the above fields with respect to the structured result may be calculated. The fields with the importance degree exceeding a preset threshold or with the importance degree in the top-three may be selected as the candidate fields. The above candidate fields may be spliced and combined to generate the plurality of candidate text information, for example, "Tomorrow temperature in Beijing is from XX to XX Celsius degrees, and the weather is sunny", "Tomorrow weather in Beijing is sunny, the temperature is from XX to XX Celsius degrees" and so on. The text suitable to be broadcast continuously may be generated according to these disperse fields. After the plurality of candidate text information is generated, the similarity of the query sentence with respect to each candidate text information is calculated based on a language model, a syntax model, a semantic model, etc. The candidate text information with the highest similarity with respect to the query sentence is selected finally. The similarity may include at least one of a literal similarity, a semantic similarity and a broadcast style similarity.

Figure 6:
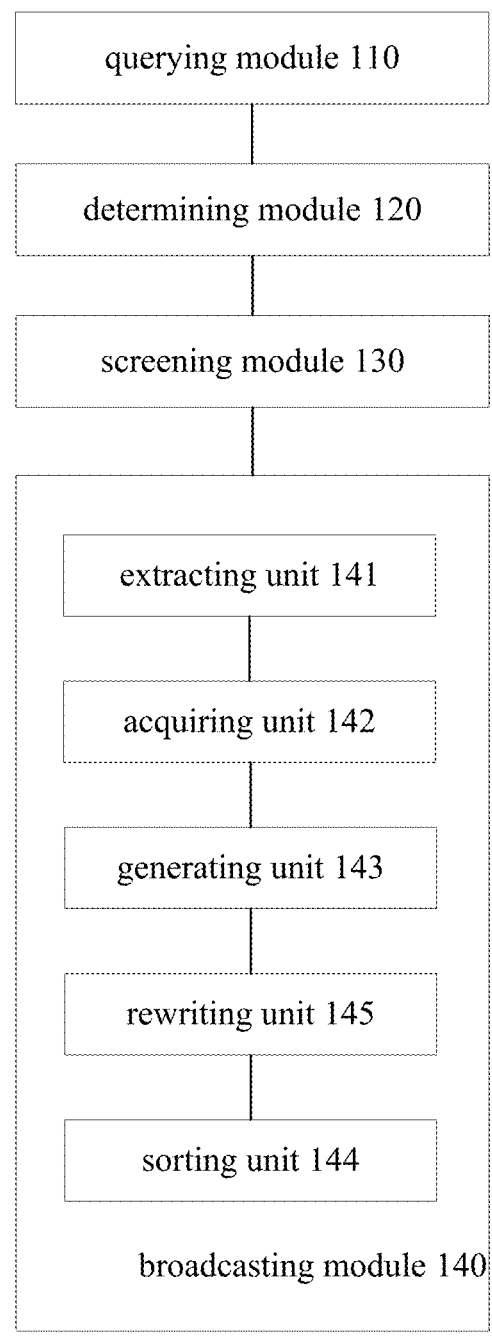
FIG. 6 is a second block diagram illustrating an apparatus for broadcasting a search result based on artificial intelligence according to an embodiment of the present disclosure.

In addition, as shown in FIG. 6, the broadcasting module 140 may further include a rewriting unit 145.

In order to make the broadcasting be more in line with oral habits, the rewriting unit 145 is configured to perform a colloquial broadcast rewriting on the plurality of candidate text information after the plurality of candidate text information is generated. For example: number 100000, if it is determined as a postal code, it may be rewritten as "one, zero, zero, zero, zero, zero", so as to avoid being broadcast as "one hundred thousand". For another example, a polyphone is rewritten, such as "Shan" in "Shan Tian-Fang" (who is a Chinese) is broadcast Shan, reading of the fourth tone.

If the category of each candidate search result is the rich-text result, the broadcasting module 140 is configured to perform a preprocessing on the rich-text result, in which the preprocessing may include at least one of text extraction, text de-duplication, keyword analysis, text structural analysis. Then broadcasting module 140 extracts characteristics of a plurality of candidate sentences in the rich-text result based on a generalized language model, in which the characteristics may include at least one of a semantic similarity and/or a intention similarity of each candidate sentence with respect to the query sentence, position information of each candidate sentence in the rich-text result and keyword information included in each candidate sentence. Then broadcasting module 140 calculates a score of each candidate sentence according to the characteristics. Finally, broadcasting module 140 sorts the plurality of candidate sentences according to the score, and generates the text information corresponding to the screened search result according to the sorted result.

For example, if the rich-text result is a news page of "lottery of passenger cars in Beijing", a main body of each page may be extracted. The structural analysis may be performed on the main body, for example, the main body is divided into three paragraphs, and contains a total of ten statements. The sentences related to the intention of "lottery of passenger cars in Beijing" may be extracted from the main body, and then characteristics of each sentence may be selected based on a language model, a syntax model, a semantic model, etc. The characteristics may include the semantic similarity related to "lottery of passenger cars in Beijing", location of the sentence in the main body, and whether or not the sentence includes key words, such as "Beijing," "passenger cars," "lottery," etc. The score of each candidate sentence is calculated according to the above characteristics, and then candidate sentences are sorted in an order of the score from high to low. For example, the sentence with the high similarity has a high score, the sentence with more keywords has a high score, etc. Finally the sentence with the highest score may be used as the abstract of the main body, i.e. the text information to be broadcasted, thereby realizing an aim that the lengthy text is reduced to concise abstract information with a clear intention and avoiding a too long broadcast time. Certainly, in order to make the broadcasting be more in line with oral habits, a colloquial broadcast rewriting may be performed on the candidate text information.

After the text information is generated, the broadcasting module 140 is configured to synthesize the text information into speech information based on a TTS speech synthesis technology, and to broadcast the speech information. For example, if the user queries tomorrow weather in Beijing, the finally broadcasted speech information may be a message "tomorrow weather in Beijing is sunny, temperature is from 5 to 15 Celsius degrees, with the north wind from level 2 to level 3." Instead of just showing the next week' weather in Beijing to the user through the search result page, the search result required by the user is broadcasted directly, which is more in line with user' needs. And the speech broadcast may also increase enjoyment, attract the user's attention and deepen the impression of the user on the search result. Certainly, recommendation information may be broadcasted, for example, information "Please keep warm in cold weather" and other information may also be broadcasted according to the weather conditions after the weather conditions are broadcasted. The search results may be shown in the search result page at the same time when the speech information is broadcasted, thereby ensuring that the user may obtain consistent information visually and acoustically, so as to further enhance the user' experience.

The apparatus for broadcasting a search result based on artificial intelligence according to embodiments of the present disclosure, by analyzing the query sentence inputted by the user to acquire the corresponding intention information, and selecting the search result meeting the broadcasting condition, and finally broadcasting the search result meeting user's intention via the generated continuous natural speech, may intuitively feedback core information required by the user, reduce user's operating costs, save user's time, and become more intelligent.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more, for example, two, three, unless specified otherwise.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A method for broadcasting a search result based on artificial intelligence, comprising:
   receiving a query sentence inputted by a user, and acquiring a plurality of candidate search results according to the query sentence;
   analyzing each candidate search result to determine a category of each candidate search result, wherein the category comprises a structured result and a rich-text result, the structured result comprises an Aladdin result directly showing an entity result via an interface on a current page, and the rich-text result comprises a text information result including at least one category of forums and libraries;
   acquiring intention information of the query sentence, and screening the plurality of candidate search results according to the intention information and the category of each candidate search result to obtain a screened search result, and determining whether the intention information comprises an intention of broadcasting with speech according to the category and screening out the query sentence with the intention of broadcasting with speech, in which the search result with an intention of broadcasting without speech is discarded, and the search result that is not the structured result and the rich-text result is discarded when the intention information of the query sentence has the intention of broadcasting with speech; and
   generating text information corresponding to the screened search result, and broadcasting the text information,
   wherein the method comprises:
   generating the text information with different manners according to the structured result and the rich-text result, comprising: performing a disperse information process to splice and combine candidate fields in the structured result according to importance degrees of the candidate fields with respect to the structured result so as to generate the text information when the category is the structured result, and performing an abstract extraction and reduction process to generate the text information to be broadcasted for decreasing a broadcasting time when the category is the rich-text result.

2. The method according to claim 1, wherein analyzing each candidate search result to determine a category of each candidate search result comprises:
   acquiring page content information corresponding to each candidate search result;
   parsing the page content information and extracting a data characteristic corresponding to the page content information; and
   determining the category of each candidate search result according to the data characteristic.

3. The method according to claim 1, wherein, if the category of each candidate search result is the structured result, generating text information corresponding to the screened search result comprises:
   extracting a plurality of fields contained in the structured result;
   calculating an importance degree of each field with respect to the structured result, and acquiring a candidate field meeting a preset condition according to the importance degree;
   generating a plurality of candidate text information according to the candidate field; and
   calculating a similarity of the query sentence with respect to each candidate text information, and sorting the plurality of candidate text information according to the similarity, and generating the text information corresponding to the screened search result according to a sorted result.

4. The method according to claim 3, further comprising:
performing a colloquial broadcast rewriting on the plurality of candidate text information.

5. The method according to claim 3, wherein calculating a similarity of the query sentence with respect to each candidate text information comprises:

calculating the similarity of the query sentence with respect to each candidate text information based on a generalized language model, wherein the similarity comprises at least one of a literal similarity, a semantic similarity and a broadcast style similarity.

6. The method according to claim 3, wherein sorting the plurality of candidate text information according to the similarity comprises:
sorting the plurality of candidate text information based on a preset ranking model, the preset ranking model comprising a Linear-Regression ranking model, and a Pair-Wise ranking model.

7. The method according to claim 1, wherein if the category of each candidate search result is the rich-text result, generating text information corresponding to the screened search result comprises:
performing a preprocessing on the rich-text result, the preprocessing comprising at least one of a text extraction, a text de-duplication, a keyword analysis, a text structural analysis;
extracting characteristics of a plurality of candidate sentences in the rich-text result based on a generalized language model, the characteristics comprising at least one of a semantic similarity of each candidate sentence with respect to the query sentence, an intention similarity of each candidate sentence with respect to the query sentence, position information of each candidate sentence in the rich-text result and keyword information contained in each candidate sentence;
calculating a score of each candidate sentence according to the characteristics;
sorting the plurality of candidate sentences according to the score, and generating the text information corresponding to the screened search result according to a sorted result.

8. The method according to claim 1, wherein broadcasting the text information comprises:
synthesizing the text information into speech information based on a TTS speech synthesis technology, and broadcasting the speech information.

9. An apparatus for broadcasting a search result based on artificial intelligence, comprising:
a processor; and
a memory configured to store an instruction executable by the processor;
wherein the processor is configured to:
receive a query sentence inputted by a user, and acquire a plurality of candidate search results according to the query sentence;
analyze each candidate search result to determine a category of each candidate search result, wherein the category comprises a structured result and a rich-text result, the structured result comprises an Aladdin result directly showing an entity result via an interface on a current page, and the rich-text result comprises a text information result including at least one category of forums and libraries;
acquire intention information of the query sentence, and screen the plurality of candidate search results according to the intention information and the category of each candidate search result to obtain a screened search result, and determine whether the intention information comprises an intention of broadcasting with speech according to the category and screen out the query sentence with the intention of broadcasting with speech, in which the search result with an intention of broadcasting without speech is discarded, and the search result that is not the structured result and the rich-text result is discarded when the intention information of the query sentence has the intention of broadcasting with speech; and
generate text information corresponding to the screened search result, and broadcast the text information,
wherein the processor is configured to:
generate the text information with different manners according to the structured result and the rich-text result by performing a disperse information process to splice and combine candidate fields in the structured result according to importance degrees of the candidate fields with respect to the structured result so as to generate the text information when the category is the structured result, and performing an abstract extraction and reduction process to generate the text information to be broadcasted for decreasing a broadcasting time when the category is the rich-text result.

10. The apparatus according to claim 9, wherein the processor is configured to analyze each candidate search result to determine a category of each candidate search result, by acts of:
acquiring page content information corresponding to each candidate search result;
parsing the page content information and extract a data characteristic corresponding to the page content information; and
determining the category of each candidate search result according to the data characteristic.

11. The apparatus according to claim 9, wherein, if the category of each candidate search result is the structured result, the processor is configured to generate text information corresponding to the screened search result, by acts of:
extracting a plurality of fields contained in the structured result;
calculating an importance degree of each field with respect to the structured result, and acquiring a candidate field meeting a preset condition according to the importance degree;
generating a plurality of candidate text information according to the candidate field; and
calculating a similarity of the query sentence with respect to each candidate text information, and sorting the plurality of candidate text information according to the similarity, and generating the text information corresponding to the screened search result according to a sorted result.

12. The apparatus according to claim 11, wherein the processor is further configured to:
perform a colloquial broadcast rewriting on the plurality of candidate text information.

13. The apparatus according to claim 11, wherein the processor is configured to calculate a similarity of the query sentence with respect to each candidate text information, by acts of:
calculating the similarity of the query sentence with respect to each candidate text information based on a generalized language model, wherein the similarity comprises at least one of a literal similarity, a semantic similarity and a broadcast style similarity.

14. The apparatus according to claim 11, wherein the processor is configured to sort the plurality of candidate text information according to the similarity, by acts of:
sorting the plurality of candidate text information based on a preset ranking model, the preset ranking model comprising a Linear-Regression ranking model, and a Pair-Wise ranking model.

15. The apparatus according to claim 9, wherein if the category of each candidate search result is the rich-text result, the processor is configured to generate text information corresponding to the screened search result, by acts of:
- performing a preprocessing on the rich-text result, the preprocessing comprising at least one of a text extraction, a text de-duplication, a keyword analysis, a text structural analysis;
- extracting characteristics of a plurality of candidate sentences in the rich-text result based on a generalized language model, the characteristics comprising at least one of a semantic similarity of each candidate sentence with respect to the query sentence, an intention similarity of each candidate sentence with respect to the query sentence, position information of each candidate sentence in the rich-text result and keyword information contained in each candidate sentence;
- calculating a score of each candidate sentence according to the characteristics;
- sorting the plurality of candidate sentences according to the score, and generate the text information corresponding to the screened search result according to a sorted result.

16. The apparatus according to claim 9, wherein the processor is configured to broadcast the text information, by acts of:
- synthesizing the text information into speech information based on a TTS speech synthesis technology, and broadcasting the speech information.

\* \* \* \* \*